(12) United States Patent
Hirose

(10) Patent No.: US 6,204,986 B1
(45) Date of Patent: Mar. 20, 2001

(54) DRUM MOTOR CONTROLLER USING MICROCOMPUTER FOR INTERMITTENT SLOW VTR

(75) Inventor: Yoshiki Hirose, Daito (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/117,093
(22) PCT Filed: Jan. 29, 1997
(86) PCT No.: PCT/JP97/00222
§ 371 Date: Jul. 22, 1998
§ 102(e) Date: Jul. 22, 1998
(87) PCT Pub. No.: WO97/28531
PCT Pub. Date: Aug. 7, 1997

(30) Foreign Application Priority Data

Jan. 31, 1996 (JP) .................................................. 8-015720

(51) Int. Cl.⁷ .................................................. G11B 21/04
(52) U.S. Cl. .................................................. 360/70; 386/78
(58) Field of Search .................................................. 360/70; 386/78, 386/79, 80, 81

(56) References Cited

U.S. PATENT DOCUMENTS 5,548,455 * 8/1996 Sato .................................................. 360/70 X
5,777,814 * 7/1998 Park et al. .................................................. 360/73.08

FOREIGN PATENT DOCUMENTS 2-299489 * 12/1990 (JP) .................................................. 360/70
4-35234 * 3/1992 (JP) .................................................. 360/70
7-312003 * 11/1995 (JP) .................................................. 360/70

* cited by examiner

Primary Examiner—Alan T. Faber
(74) Attorney, Agent, or Firm—Michaelson & Wallace; Peter L. Michaelson

(57) ABSTRACT

For intermittent slow activation, jitter is caused for reproduced image due to increase in the relative speed of a magnetic tape and a magnetic head. To solve this problem, a rotating speed of a drum motor 11 must also be increased. Then, a microcomputer 19 generates a control output PWM using as PWM data a value obtained by adding a prescribed value to a command value of a normal rotating speed, so as to perform correction control for activation. Thereby, correction to constant speed can always be achieved even when there is a difference between operating points of drum motor 11 due to the change in PWM data at the normal speed. Further, since jitter is caused for reproduced image due to the change in the relative speed of the magnetic tape and the magnetic head in braking a capstan motor 10, jitter is corrected by subtracting a prescribed value from the drum control PWM data at the normal rotating speed.

3 Claims, 6 Drawing Sheets

DRUM MOTOR CONTROLLER USING MICROCOMPUTER FOR INTERMITTENT SLOW VTR

TECHNICAL FIELD

The present invention relates to a magnetic recording and reproducing apparatus such as a videotape recorder (VTR).

BACKGROUND ART

For intermittent slow reproduction in which activating and braking pulses are alternately supplied to a capstan motor for tape feed of a VTR to repeat a still status and a two-field standard traveling status, if a head drum is rotated at the same speed for still and standard reproduction, lateral vibration (jitter) of an image is caused by the change in the relative speed of a video head and the tape.

To prevent such jitter of the image, as described in Japanese Utility Model Laying-Open No.4-35234, acceleration of the capstan motor is detected to increase the speed of the speed control data of the rotating drum, or deceleration of the capstan motor is detected to decrease the speed of the speed control data of the rotating drum for braking.

In this method, however, a sufficient effect cannot be ensured to reduce the jitter as time delay is caused for the actual control voltage applied to the drum motor when the capstan motor is activated, as shown in FIG. 2.

Then, common practice is to employ a method of directly applying a pulse voltage to a rotating drum control voltage together with the method described above.

FIG. 3 shows a block diagram of a conventional rotating speed control circuit for a head.

In the activation process for intermittent driving, the activating pulse is generated in a capstan intermittent driving control circuit (2) in accordance with a head switching signal generated in a head switching signal generating circuit (1) and is supplied to a capstan control PWM output generating means (3).

In capstan control PWM (Pulse Width Modulation) output generating means (3), a PWM output signal at H (at high level) is generated for a prescribed period of time, which is then smoothed by a low pass filter (LPF) and converted to a direct-current voltage signal for driving a capstan motor (4).

Thereafter, an error with respect to a target speed is calculated in accordance with an FG pulse output from capstan motor (4) in a capstan controlling means (5), a calculation result is transmitted to capstan control PWM output generating circuit (3), and the PWM output signal is output in accordance with the calculation result from capstan control PWM output generating circuit (3), so that rotation control of the capstan motor is performed.

Then, a control signal recorded on a magnetic tape is reproduced by a CTL head (6) and, a braking pulse is generated in capstan intermittent driving control circuit (2) delayed by a prescribed period of time with respect to the reproduced control signal, thereby braking capstan motor (4).

Intermittent slow reproduction is performed by a series of above described operations.

In activating capstan motor (4) (denoted by A in FIG. 4), however, a relative speed a drum motor (7) and the magnetic tape, that is, the relative speed of the rotary video head and the video signal recorded on the magnetic tape, is rapidly changed, thereby causing lateral vibration of the reproduced image.

To solve this problem, a correction pulse is generated in a drum correcting output generating circuit (8) and directly applied to a voltage which drives drum motor (7) through a diode (9) when the drum motor is activated.

In this method, a dedicated output port must be provided in a control microcomputer and a circuit component such as a diode is required, which may considerably increase a substrate mounting space and material cost.

DISCLOSURE OF THE INVENTION

The present invention is an intermittent slow controller of a magnetic recording and reproducing apparatus for intermittently driving a magnetic tape by alternately supplying activating and braking pulses to a capstan motor and reading a video signal by a magnetic head mounted to a rotating drum. The intermittent slow controller is characterized in that a drum controlling means for controlling a voltage driving the rotating drum is provided and that the drum controlling means increases the voltage driving the drum by a prescribed value in activating the capstan motor and decreases the voltage driving the drum by the prescribed value in braking the capstan motor.

Further, a drum control PWM output generating portion outputting a signal having a pulse width in accordance with an output from the drum controlling means is provided, whereby the output from the drum controlling means increases the pulse width of the drum control PWM output generating portion by a prescribed value in activating the capstan motor, and decreases the voltage driving the drum by a prescribed value in braking the capstan motor.

In addition, the output pulse width of the PWM output generating portion is set by supplying PWM data which has been corrected by the drum control PWM output generating portion, where the setting of the drum control PWM output generating portion and the output pulse width is performed within the microcomputer.

Thus, using the intermittent slow controller according to the present invention, jitter of the image at the time of intermittent slow reproduction can be corrected without the need for a dedicated output port or circuit component and constant correction can always be performed without being affected by the difference of operating points of the rotating drum motor.

BEST MODE FOR CARRYING OUT THE INVENTION

Figure 1:
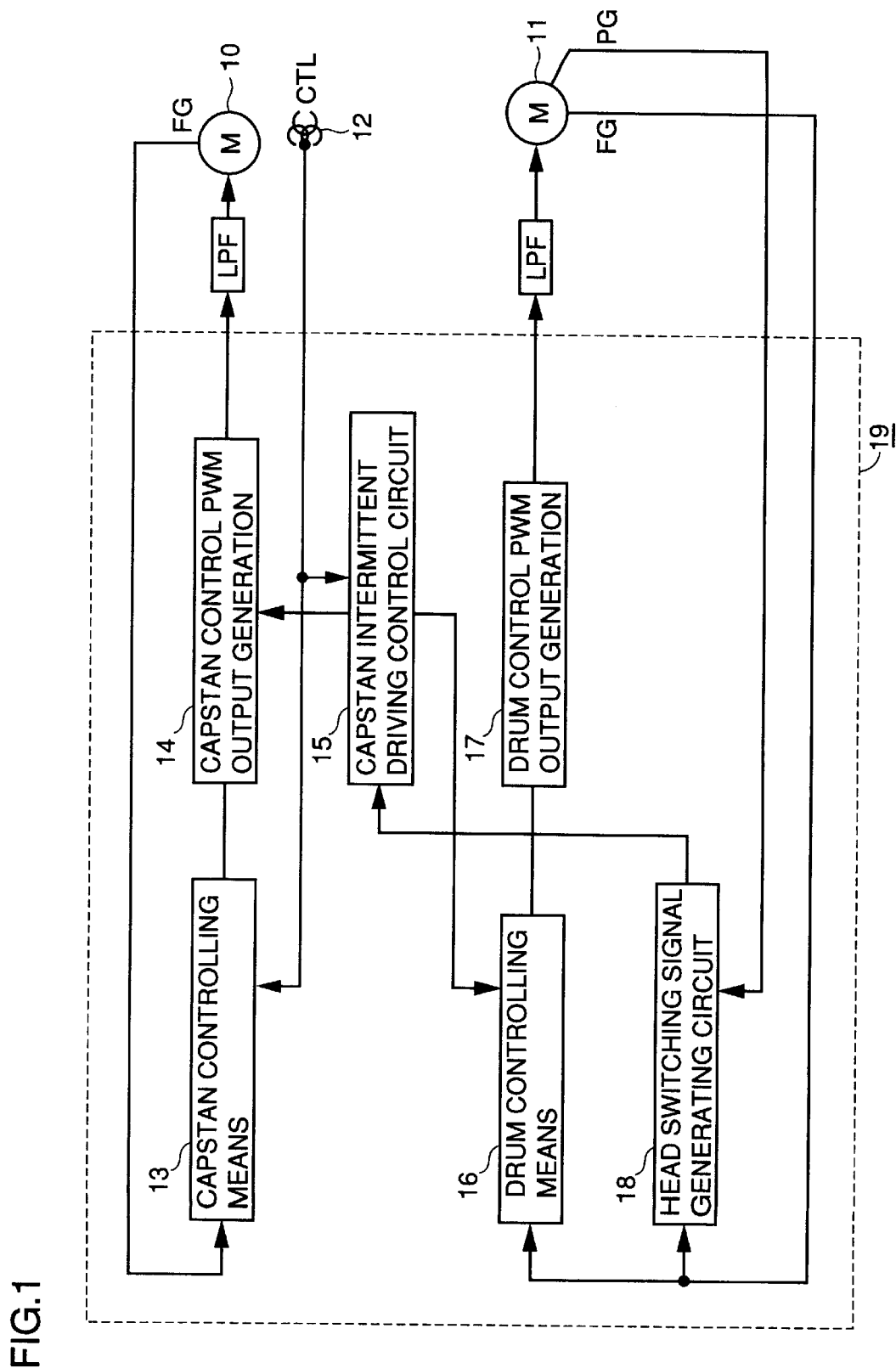
FIG. 1 is a block diagram showing an intermittent slow controller according to the present invention.
Figure 2:
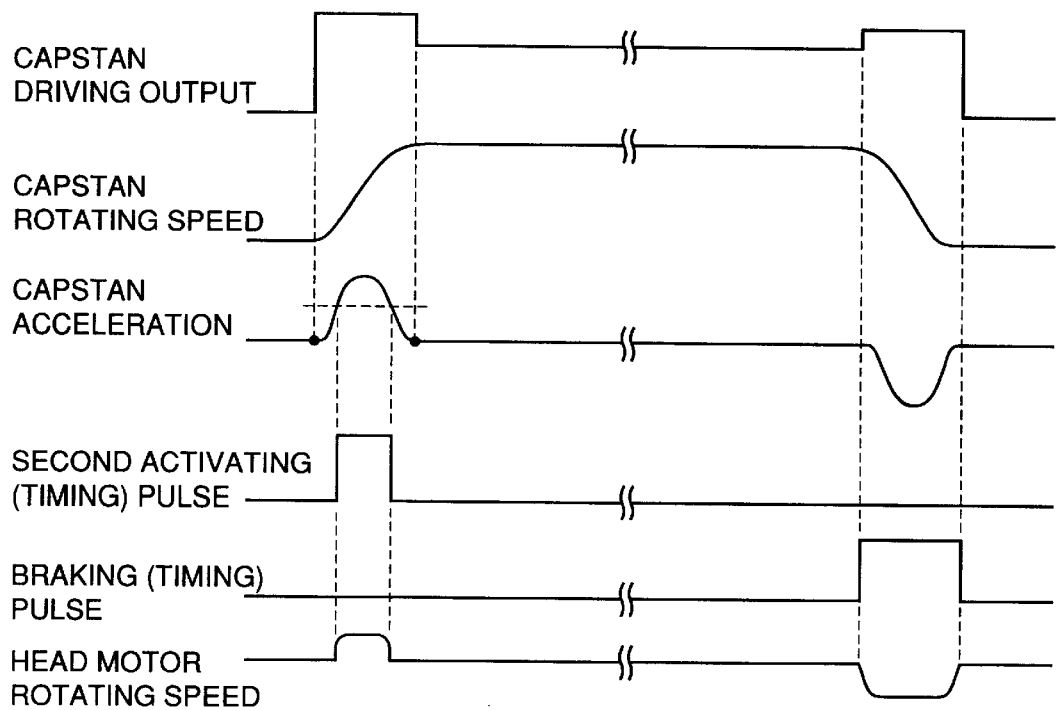
FIG. 2 is a diagram showing a control timing chart of a conventional intermittent slow controller.
Figure 3:
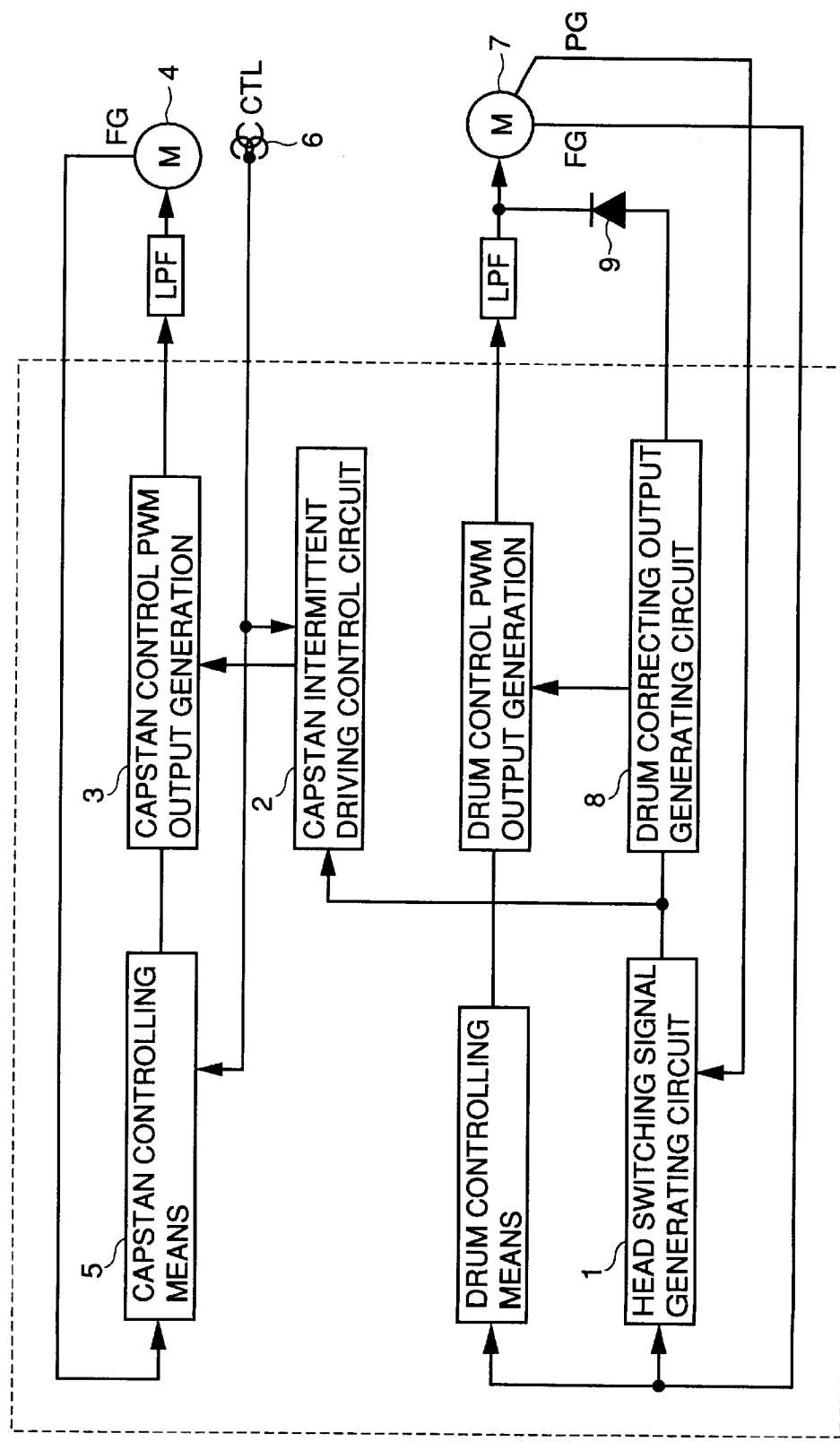
FIG. 3 is a block diagram showing a conventional intermittent slow controller.
Figure 4:
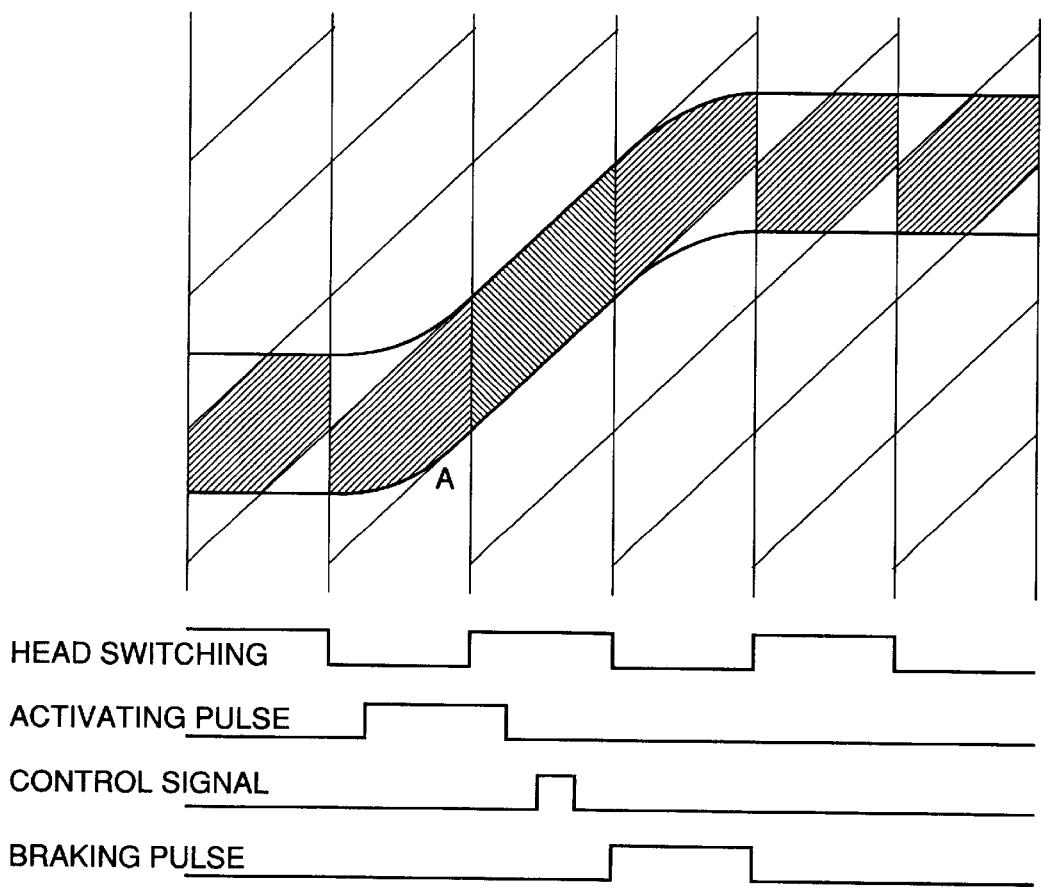
FIG. 4 is a diagram showing a tape driving timing chart for intermittent slow reproduction.
Figure 5:
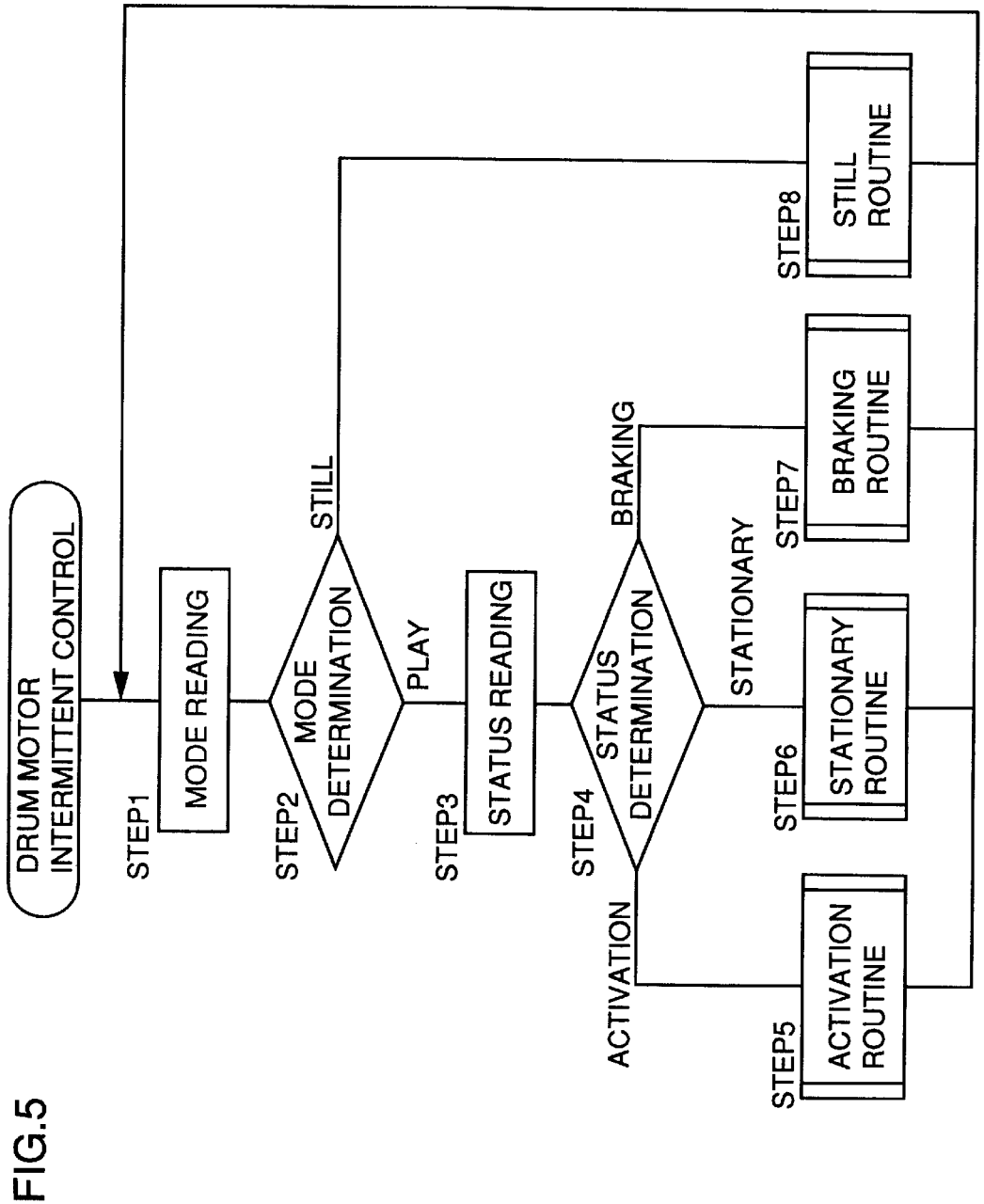
FIG. 5 is a control flowchart for intermittent slow according to the present invention.
Figure 6:
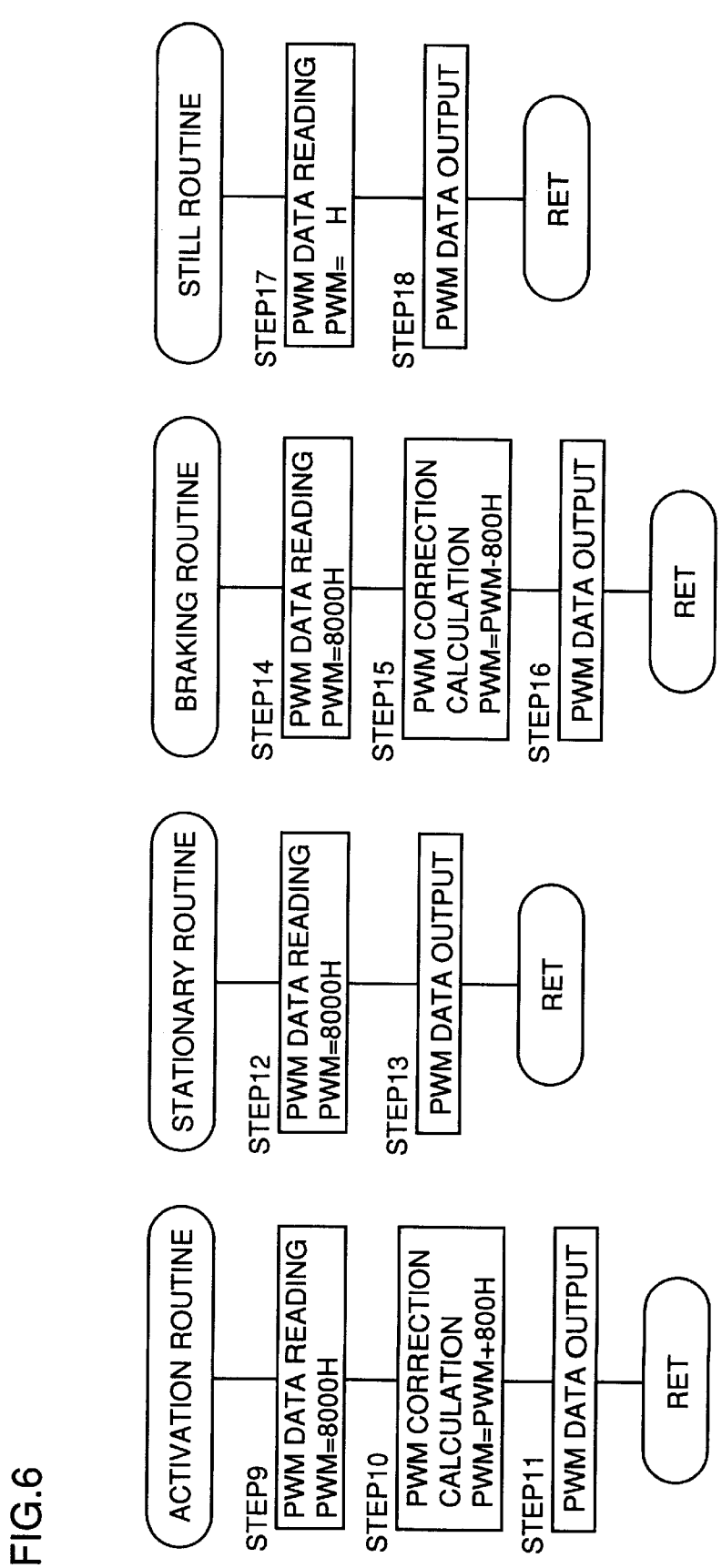
FIG. 6 is a control flowchart for intermittent slow according to the present invention.

Referring to FIGS. 1,5 and 6, an embodiment of the present invention will be described.

An operation for intermittent slow reproduction will be described with reference to the drawings.

FIG. 1 is a block diagram showing an intermittent slow controller of a VTR in accordance with the present invention.

In the drawing, denoted by (10) is a capstan motor which transports magnetic tape. A drum motor (11) performs rotation control for a video head recording and reproducing a signal onto and from the magnetic tape. A control head (12) records and reproduces a position signal (hereinafter referred to as a control signal) required for controlling the capstan motor onto and from a control track of the magnetic tape. A capstan controlling means (13) performs speed control calculation in accordance with an FG signal generated by rotation of capstan motor (10) and the control signal and determines a pulse width of a PWM output signal.

A PWM output generating circuit (14) generates the PWM signal having the pulse width in accordance with a signal output from capstan controlling means (13), smoothes the generated PWM signal by a low pass filter and converts it to a direct-current voltage signal for output as a motor control signal. A capstan intermittent driving control circuit (15) performs control calculation for intermittent driving control of the capstan motor and outputs the result to the PWM output signal generating circuit.

A drum controlling means (16) performs speed control calculation in accordance with a drum FG signal generated by rotation of drum motor (11) and determines the pulse width of the PWM output signal for driving the drum motor. A drum control PWM output generating circuit (17) generates and outputs a PWM signal for driving drum motor (11) by a control output signal from drum controlling means (16). A head switching signal generating circuit (18) generates a switching timing of the video head in accordance with drum PG and FG signals.

A control microcomputer (19) includes the controlling means (13) to (18), which are described above, and drives capstan motor (10) and drum motor (11) by executing a control program by a CPU.

Then, when a command of slow reproduction is applied to the VTR for an intermittent slow mode, control in status modes of activation, stationary and braking is repeatedly performed for the capstan motor by capstan intermittent driving control circuit (15), so that the tape is intermittently transported.

Thereafter, the drum motor follows the control flow shown in FIGS. 5 and 6, whereby a drum control PWM signal is generated by drum controlling means (16) and drum control PWM output generating circuit (17) in accordance with the above mentioned statuses of activation, stationary and braking for controlling the speed of the drum motor.

An operation for drum motor control will now be described with reference to the control flow.

In a drum motor intermittent control program (FIG. 5), first, mode information indicating whether the current status of intermittent feed is in a reproduction or still mode is read in a step 1, and the mode is determined in a step 2.

Here, if the reproduction mode is determined, status information, that is, status information of activation, stationary or braking is read from capstan intermittent driving control circuit (15) in a step 3.

These modes are determined in a step 4 and processing routines (steps 5,6,7) are performed. If the still mode is determined in step 2, still routine is performed in a step 8.

After the processing of the routines is completed, a current mode is again read in step 1 and the above mentioned step 2 and the following steps are performed. The operation is repeated until the command of the intermittent slow is executed.

Control of the processing routine (FIG. 6) will now be described.

In an activating routine, PWM data is read in a step 9. The PWM data is a value for setting the pulse width of the voltage which is applied to the drum motor for controlling the speed of the drum in a stationary status in the reproduction mode and, here, a value (8000H) which has been stored in a memory as a setting value for normal reproduction is read as PWM data. In a step 10, correction calculation is performed by adding a prescribed value (800H) to PWM data for obtaining new PWM data (8800H). Next, in a step 11, the value (8800H) is output to the drum control PWM output generating circuit.

In a stationary routine, a value (8000H) for setting the pulse width of the voltage applied to the drum motor for controlling the speed of the drum is read in the stationary status in a step 12, and the value (8800H) is output to the drum control PWM output generating circuit in a step 13.

In a braking routine, PWM data (8000H) is similarly read in a step 14.

Then, correction calculation is performed in a step 15 by subtracting a prescribed value (800H) from PWM data for obtaining new PWM data (7800H), and the value (7800H) is output to the drum control PWM output generating circuit in a step 16.

Further, in a still routine, PWM data is read in a step 17. The PWM data in this case is a value for setting the pulse width of the voltage applied to the drum motor for controlling the speed of the drum in the still mode, and a value (7D00H) which has been stored in the memory as a setting value is read.

As described above, in each process routine, the pulse width of PWM for voltage control is determined and output to the drum control PWM output generating circuit.

In the drum control PWM output generating circuit, a PWM signal is generated and output from a port by setting the output port of a microcomputer (19) at H (at high level) for a period in accordance with the values. The output PWM signal is smoothed by a low pass filter (LPF) and converted to a direct-current voltage signal for application to drum motor (11).

As described above, if the drum control PWM data is 8000H at a normal rotating speed, for correction upon activation, the rotating speed of the drum must be increased with the increase in the relative speed, so that control output PWM is generated using a value to which a prescribed value (for example 800H) is added, that is, 8800H, as PWM data. Thereby, a constant speed correction can always be achieved even if operating points of the drum motor differ due to the change in the PWM data at the normal rotating speed.

Further, the relative speed similarly changes when the capstan motor is braked and jitter is caused for the reproduced image. Thus, the rotating speed of the drum motor is decreased and jitter is corrected by subtracting a prescribed value from the drum control PWM data at the normal rotating speed in a similar manner as described above.

As in the foregoing, using the intermittent slow controller according to the present invention, jitter of the image in intermittent slow reproduction is corrected without the need for the dedicated output port or circuit component, and constant correction can always be performed without being affected by the difference of the operating points of the rotating drum motor.

INDUSTRIAL APPLICABILITY

The present invention can suitably be applied to a controlling technique of the VTR and, particularly to the technique for preventing lateral vibration of the reproduced image in intermittent slow reproduction.

What is claimed is:

1. An intermittent slow controller, of a magnetic recording and reproducing apparatus, for intermittently driving a magnetic tape by alternately supplying activation and braking pulses to a capstan motor and reading a video signal by a magnetic head mounted to a rotating drum, the intermittent slow controller comprising:

a microcomputer for controlling voltages of said capstan motor and of a motor for driving said rotating drum;

wherein, in response to an instruction from the microcomputer during the intermittent driving, a voltage for driving the drum is applied with a voltage value higher, by a predetermined value, than that for normal reproduction and concurrently with activation of the capstan motor.

2. The intermittent slow controller recited in claim 1, wherein:

the voltage for driving the drum is applied with the voltage value lower, by a predetermined value, than that for normal reproduction and concurrently with braking of the capstan motor.

3. An intermittent slow controller, of a magnetic recording and reproducing apparatus, for intermittently driving a magnetic tape by alternately supplying activation and braking pulses to a capstan motor and reading a video signal by a magnetic head mounted to a rotating drum, the intermittent slow controller comprising:

drum controlling means for controlling a voltage for driving the rotating drum;

a drum control PWM (pulse width modulated) output circuit for outputting a signal having a pulse width in accordance with an output from the drum controlling means; and a microcomputer for controlling, through pulse width modulation, voltages for the capstan motor and a motor for driving the rotating drum;

wherein, in response to an instruction from the microcomputer during the intermittent driving, the voltage for driving the drum is applied with the pulse width greater, by a predetermined value, than that for normal reproduction and concurrently with activation of the capstan motor.

* * * * *